United States Patent [19]
Whitehead

[11] Patent Number: 5,987,978
[45] Date of Patent: Nov. 23, 1999

[54] APPARATUS FOR TESTING TIRE TREAD DEPTH

[75] Inventor: Mark Whitehead, Northwich, United Kingdom

[73] Assignee: Assembly Technology & Test Ltd., Buckingham, United Kingdom

[21] Appl. No.: 09/039,237

[22] Filed: Mar. 16, 1998

[51] Int. Cl.⁶ .................................................. G01M 17/02
[52] U.S. Cl. ............................................................ 73/146
[58] Field of Search ................................................ 73/146

[56] References Cited

U.S. PATENT DOCUMENTS

| | | | |
|---|---|---|---|
| 3,918,816 | 11/1975 | Foster et al. | 73/146 |
| 4,095,464 | 6/1978 | Breedijk. | |
| 5,801,304 | 9/1998 | Cantu et al. | 73/146 |

FOREIGN PATENT DOCUMENTS

| | | |
|---|---|---|
| 0 440 418 | 8/1991 | European Pat. Off. . |
| 0 536 705 | 4/1993 | European Pat. Off. . |
| 0 547 365 | 6/1993 | European Pat. Off. . |
| 96/10727 | 4/1996 | WIPO . |

*Primary Examiner*—Joseph L. Felber
*Attorney, Agent, or Firm*—Dickstein Shapiro Morin & Oshinsky LLP

[57] ABSTRACT

An apparatus for determining the depth of a tire tread includes a radiation source for illuminating the tread of a tire, the direction of the illumination being non-normal with respect to the local surface of a portion of a tire under inspection, at least one detector responsive to radiation reflected from the tire, and a data processor responsive to the at least one detector for calculating the tread depth. In one embodiment, differences in displacement between radiation reflected from the top surface of a tread and radiation reflected from the bottom surface of a tread are measured to determine tread depth. In a second embodiment, the shadow cast by the top surface of the tread over the bottom surface of the tread is measured to determine tread depth. A third embodiment employs a sheet of radiation with varying wavelength to determine the tread depth.

27 Claims, 10 Drawing Sheets

APPARATUS FOR TESTING TIRE TREAD DEPTH

FIELD OF THE INVENTION

The present invention relates to an apparatus for testing the depth of tread on a tire. Such an apparatus is suitable for inclusion in a rolling road, such as is used for brake testing, or it may be provided as a hand held or ramp mounted unit for performing road side testing or diagnostic testing of tires.

BACKGROUND OF THE INVENTION

Legislation in the UK requires that a tire should have at least 1.6 mm of tread over 75% of it's road surface contact area for a car tire. Different limits apply for the other types of vehicles. Hitherto, the estimation of tread depth, and more particularly, whether this depth is maintained across the required width of the road contact area, has been performed mainly by manual inspection.

WO 96/10727 discloses a tire scanning apparatus in which a light source and a photodetector are mounted in a carriage which is driven back and forth along a scan path by a motor and drive belt. The use of a mechanical scanning system of this type may lead to an unacceptable failure rate of the system.

SUMMARY OF THE INVENTION

According to the present invention, there is provided a tire tread inspection apparatus, comprising a radiation source for illumination the tread of a tire, the direction of the illumination being inclined with respect to the local surface of a portion of a tire under inspection, at least one detector responsive to radiation reflected from the tire, and a data processor responsive to the at least one detector for indicating the acceptability of the tire.

It is thus possible to provide an automated tire inspection apparatus. The use of non-normal illumination enables the detector to be situated remote from the surface of the tire and thereby simplifies the scanning mechanism.

Preferably the radiation is light. As used herein, light includes electromagnetic radiation falling within the ultraviolet, visible and infra-red portions of the spectrum. Advantageously the at least one detector is a photodetector.

Advantageously a light spot may be scanned across the surface of the tire. The scan path may be direct from one side of the tire to the other. Thus the light spot may traverse a path which is substantially parallel with the axis of rotation of the tire.

Preferably the portion of the tire under inspection is not in contact with a surface. Thus the portion of tread under inspection is not under a compressive load during the test.

Preferably the tread inspection apparatus does not include any moving parts in the scanning system. The provision of a system which does not include moving parts can be expected to greatly improve the mean time between failure of the apparatus. Alternatively a simple mechanical scanning means, such as a rotating mirror may be utilized.

During an inspection, there may be relative motion between the inspection apparatus and the tire. This may be because the tire is being rotated on a testbed, such as a rolling road, or because the inspection apparatus or at least a sensor head thereof is being moved around the periphery of a tire, for example during a road side inspection. A consequence of the relative motion is that the light beam no longer traverses the shortest distance between the sides of the tire. However, this does not effect the accuracy or validity of the test, but may require to be compensated for if the data processor performs tire type identification on the basis of the tread pattern.

The effects of relative motion may be corrected by skewing the scan path such that the skew and the tire tread displacement due to rotation of the tire during a scan substantially cancel one another. Alternatively, the data processor may be arranged to manipulate the received data in order to remove the effects of the relative motion. Such manipulation may involve merging or interpolating data from adjacent scans.

The light spot may be scanned by a rotating mirror, a reciprocating mirror or by reciprocal displacement of the light source.

Preferably the light source is a laser. Other collimated light sources may also be used.

Alternatively a sheet of light may be used to illuminate the tire. Such a sheet of light may be generated by rapid and repeated scanning of a light spot across the surface. Alternatively, the sheet of light may be formed by distorting a collimated beam along one direction. This may be performed by passing the beam through a cylindrical lens. Alternatively commercially available laser line devices may be used to generate the sheet of light. As a further alternative an elongate light source, such as a fluorescent tube, may be used with a collimating arrangement.

Use of a beam inclined with respect to the local (i.e. scanned) surface of a tire means that the position of the light when it reflects from the tire is a function of the position of the surface with respect to the light source. Since a treaded tire has an undulating surface, the position of the reflected light should vary in accordance with the depth of the tread and the profile of the tire. More specifically, the light beam will be displaced perpendicularly to the scan direction (or longitudinal axis of the sheet of light) in accordance with the depth of the tire tread.

Advantageously the light from the light source is directed towards the surface of the tire by a light guide arrangement.

Such an arrangement may include a faceted mirror. A faceted mirror may have a sawtooth profile. This enables the mirror to be arranged at only a relatively shallow angle to the surface of the tire whilst still allowing the light to be directed at the tire at a much steeper angle thereby enabling a physically compact test head to be used. Light reflected from the tire is collected by an imaging system and returned to the one or more photodetectors.

Where the light beam is scanned across the tire, the reflected light may be directed onto a one dimensional array of photodetectors in order to form a measurement of the position of the point of reflection. Alternatively a single detector may be used in conjunction with an optical scanning system such that the detector inspects small areas of the tire surface in a sequential manner. As a further alternative a two dimensional array of detectors (i.e. camera) may be used to record the reflected light pattern.

Preferably the reflected light is returned to the or each photodetector by a further faceted mirror. The, two faceted mirrors may be inclined with respect to one another.

As an alternative to the use of faceted mirrors, transparent prisms utilizing total internal reflection may be used to obtain the same optical action. As a further alternative a diffraction element may be used to simultaneously form the reflection and also to focus the image directly on to the photodetector or camera.

The optical system may be arranged within a hand held unit. The hand held unit may have an open slit or a window which, in use, faces towards the tire, and rollers or other guide arrangements such that the hand held unit can be rotated around the surface of the tire with the slit or window facing towards the tire in order to assess the tread.

Alternatively the light source and imaging system may be built into a larger static test apparatus. In such an arrangement, it is not necessary for the light source and the imaging system to be adjacent one another. In an embodiment of a rolling road incorporating such a system, the light source and the detector are separated from one another by approximately half a meter.

The tire tread detector may be capable of analyzing treads on axles carrying two or more wheels, such as is the case with heavy goods vehicles. Thus the scan may extend along a line of 1.1 meters or more. Embodiments of the system are able to scan a tire width of 800 mm with the lateral resolution better than 0.5 mm and typically a lateral resolution of 0.25 mm. Furthermore the system can measure the tread depth with a resolution of 0.1 mm or better. The system may be arranged to scan the tire surface at 10 mm intervals or less, although it is preferred that the scan should occur every 2 mm around the circumference of the tire. For a tire rotating at 722 mm a second this results in making 72 scans per second at 10 mm intervals and 361 scans per second at 2 mm intervals, respectively.

Advantageously the at least one photodetector is a charged coupled device (CCD) camera. Such cameras allow faster data rates than traditional video cameras. Suitable camera configurations include 256×256 pixel arrays, 2048× 2048 pixel arrays (or higher), or line arrays such as 1×256, 1×2048 or higher.

An instantaneous scan across the tire can be performed when a camera is used to view the tire tread. Thus the camera is particularly suited for use in those embodiments employing a continuous sheet of light rather than a scanning spot.

The output of the camera may be sent to a frame grabber for temporary storage before transfer to the data processor. Or data processing may be carried out on the chip itself.

In an alternative tire inspection apparatus constituting a further embodiment of the present invention, at least one light source is used to obliquely illuminate the tire, in such a way that shadows are formed within the recessed portions of the tread pattern. Advantageously a second light source is also provided for illuminating the tire from a different direction. The first and second light sources may be arranged to operate in an alternating sequence and may be arranged such that the light they produce comes from opposing directions thus, for example, the inspection apparatus may illuminate the tire in an alternating sequence from either side of the plane of the tire. Those portions of the tire which are illuminated will reflect a greater intensity of light that those portions at the bottom of the treads which are in a shadowed region. By comparing the reflected light patterns when the tire is illuminated from each side it is possible to work out the depth of the tread and also to allow for and identify asymmetric wear where that may have occurred.

In a further alternative type of inspection apparatus, the light used to illuminate the tire has a spatially varying wavelength distribution. That is, in respect of visible light, it has a spatially varying color distribution. Such a distribution may be obtained by passing light from a broadband light source through a diffraction grating or prism.

The spatially varying light typically emerges from the diffraction grating or prism as a broad beam of light where the wavelength/colour changes across the beam. The beam is directed onto the surface of the tire under test and a selected region of tire is inspected so as to analyze the wavelength/polour of light reflected from the selected region. The wavelength/colour of the reflected light is a function of the position of the surface reflecting the light and hence conveys information concerning the tread depth.

The light source may be continually illuminated, or may be pulsed. Pulsed operation may be advantageous as it may allow for ambient light to be measured and then compensated for in the measurement process.

According to a second aspect of the present invention, there is provided an optical inspection arrangement comprising a light source for obliquely illuminating a portion of a tire and at least one image receiving arrangement for receiving light reflected from the tire.

Preferably the image receiving arrangement is at least one photodetector for supplying a signal to a data processor. Alternatively the image receiving arrangement may be a screen for enabling the image to be viewed.

BRIEF DESCRIPTION OF THE DRAWINGS

The present invention will further be described, by way of example, with reference to the accompanying drawings, in which.

DETAILED DESCRIPTION OF THE EMBODIMENTS

Figure 1:
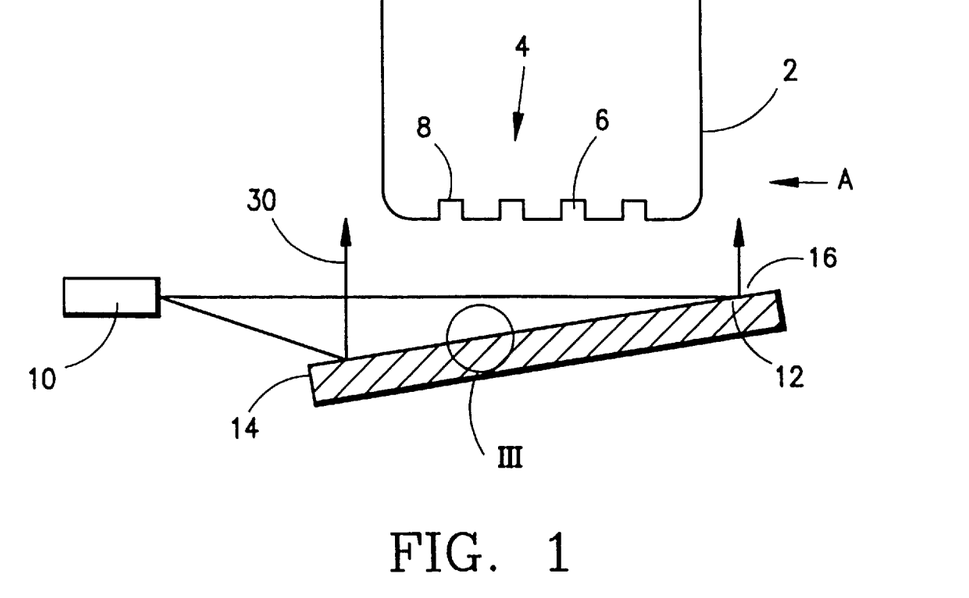
FIG. 1 schematically represents a first preferred embodiment of an apparatus for inspection of a tire tread according to the present invention.

As shown in FIG. 1, a tire 2 is provided with a treaded road contacting portion 4. The tread serves to increase the grip between the tire 2 and a road surface (not shown), and consists of a pattern of grooves 6 cut into the surface of the tire 2. The depth of those grooves 6 will be referred to herein as the tread depth and the radially innermost portion 8 of the grooves 6 will be referred to the bottom of the tread.

The inspection apparatus comprises a light source 10 and a reflector 12. The light source 10 produces a sheet of light 30, i.e. it produces a line of illumination along the surface of the tire 2.

Figure 14:
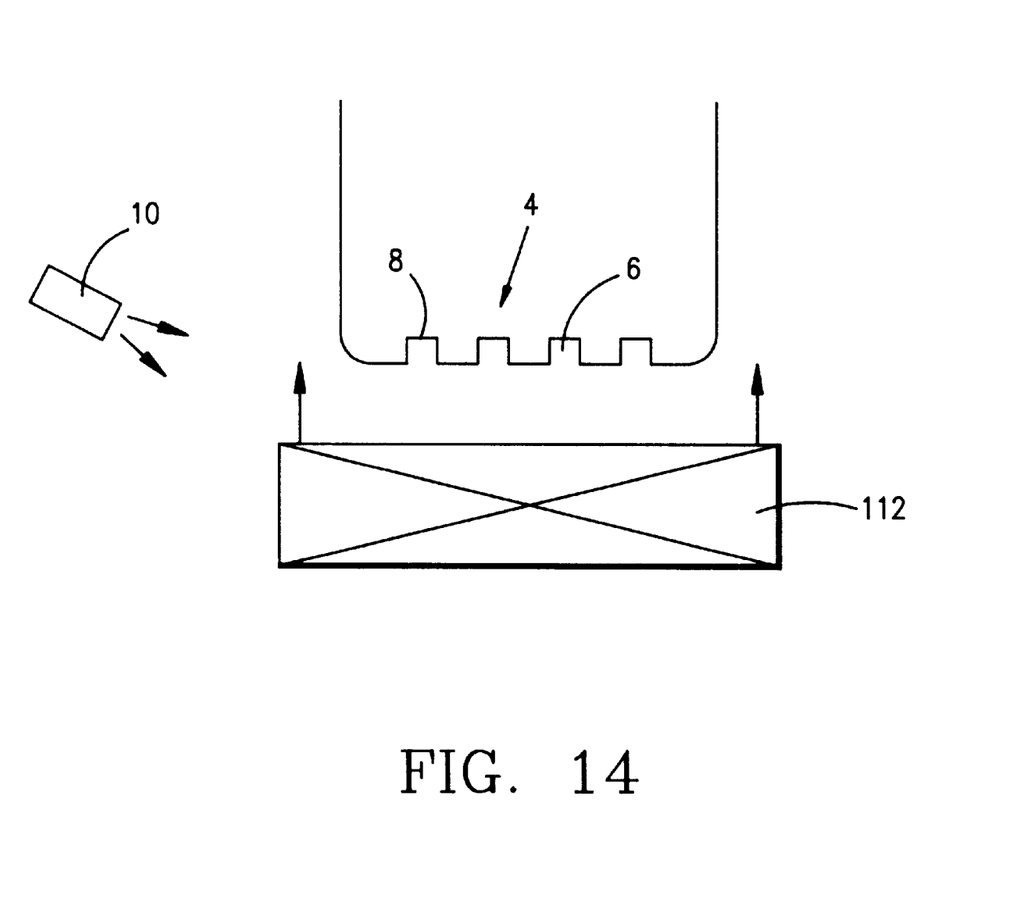
FIG. 14 schematically represents a seventh preferred embodiment of an apparatus for inspection of a tire tread according to the present invention.

In one embodiment of the invention, the line of light is produced by an elongate light source and a suitable collimating system. However, the preferred means for producing the elongate line are a scanned laser spot, produced, for example by a solid state laser in combination with a rotating or reciprocating mirror in order to scan the spot along a line (such devices are well known and need not be described here), or a laser line generator. An example of a commercially available laser line generator is a line generator from Vector Technology Limited, which generates a line with a total fan angle of 106°. This gives a total line width of 1100 m at a distance of 414.5 mm from the source. However, due to possible aberration effects, it is prudent to use a spacing greater than this minimum distance. However, it is possible to use a plurality of these devices in combination to produce a longer line or to reduce the distance between the source and the tire 2. Light from the light source 10 extends (or is scanned between) positions 14 and 16 on the surface of the reflector 12. The reflector 12 may be a faceted mirror. The reflector 12 reflects the light towards the tire 2 in such a manner that, when viewed in the plane of FIG. 1, the light is directed radially inwards towards the surface of the tire 2. Alternatively, the reflector 12 may be a prism utilizing total internal reflection such as the prism 112 shown schematically in FIG. 14.

Figure 2:
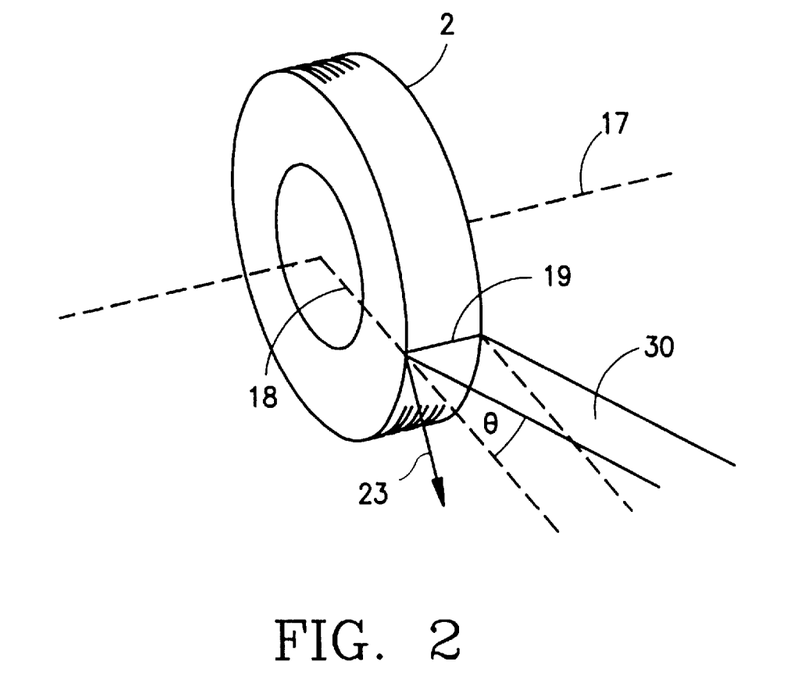
FIG. 2 is a perspective schematic view of the optical path to and from a tire under test for the apparatus of FIG. 1.

FIG. 2 illustrates the relative positions of the optical paths to and from the tire 2 in greater detail. The tire 2 has an axis of rotation represented by a chain line 17. A second chain line 18 represents the radial path between the axis of rotation and the portion 19 of the tire 2 which is being inspected. Light 30 directed towards the surface of the tire 2 is perpendicular to but does not intersect the axis of rotation 17 and is inclined with respect to a plane containing lines 17 and 18. As shown in FIG. 2, the light 30 incident on the tire 2 is above the plane and inclined with respect to the plane by an angle θ. Light 23 specularly reflected from the tire 2 lies below the plane and is inclined thereto by θ.

Figure 3:
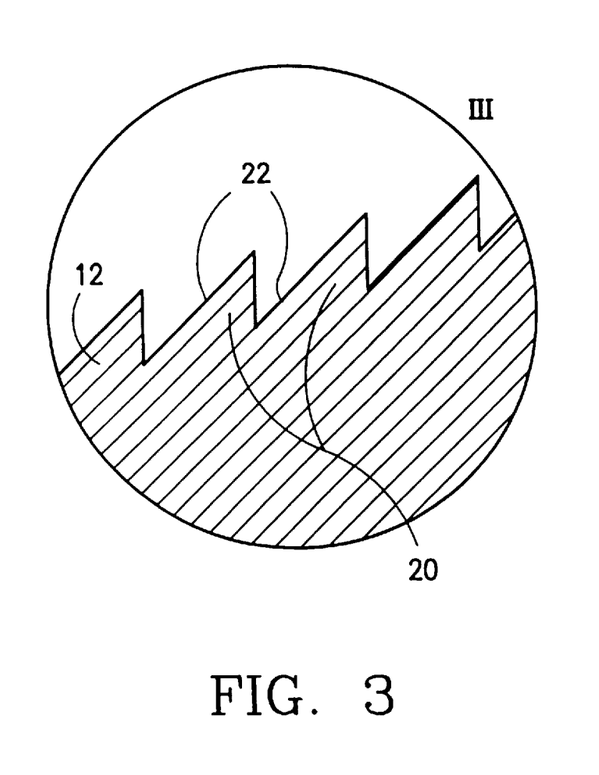
FIG. 3 is a cross sectional view of a portion of a faceted mirror shown in circle III of FIG. 1.

FIG. 3 illustrates the section of the faceted mirror 12 in circle III of FIG. 1 in greater detail. The faceted mirror 12 comprises a series of triangular sections 20 each having a surface 22. The surface 22 is inclined such that it reflects light from the light source 10 towards the tire 2 such that the tire 2 is illuminated as shown in FIG. 2.

Figure 4:
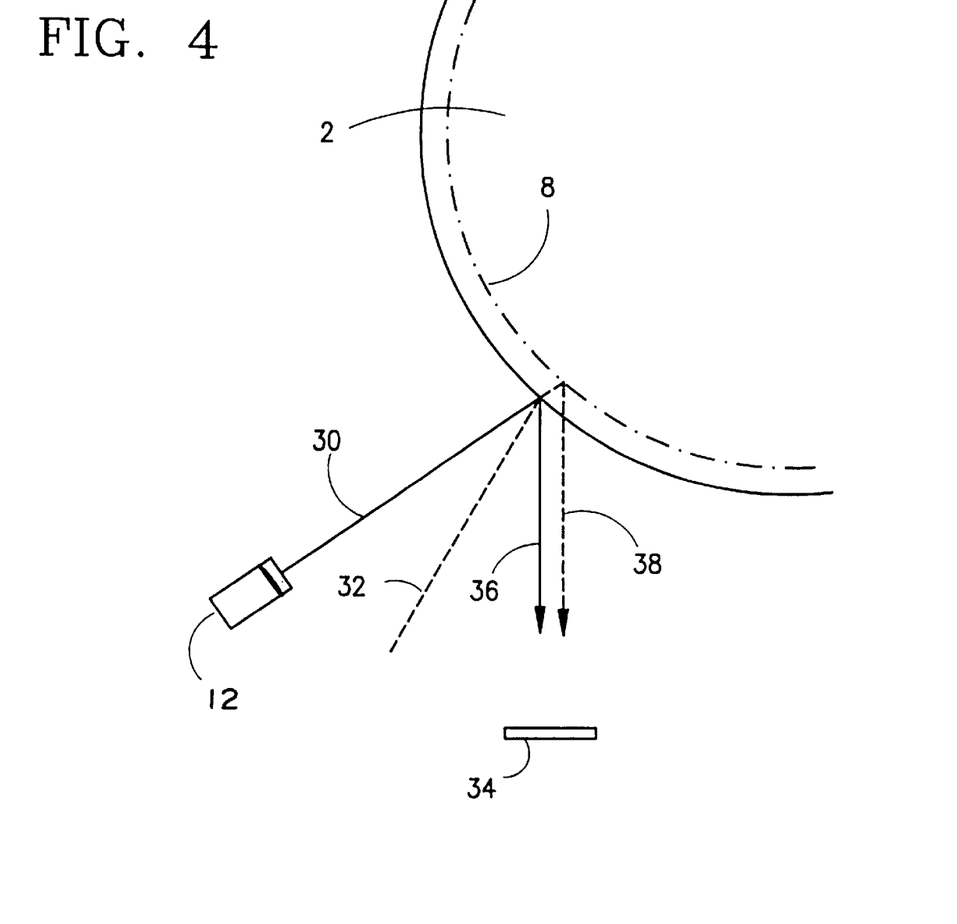
FIG. 4 schematically illustrates the optical paths for light reflected from the surface of the tire and for light reflected from the bottom of the tread pattern with the apparatus of FIG. 1.
Figure 5:
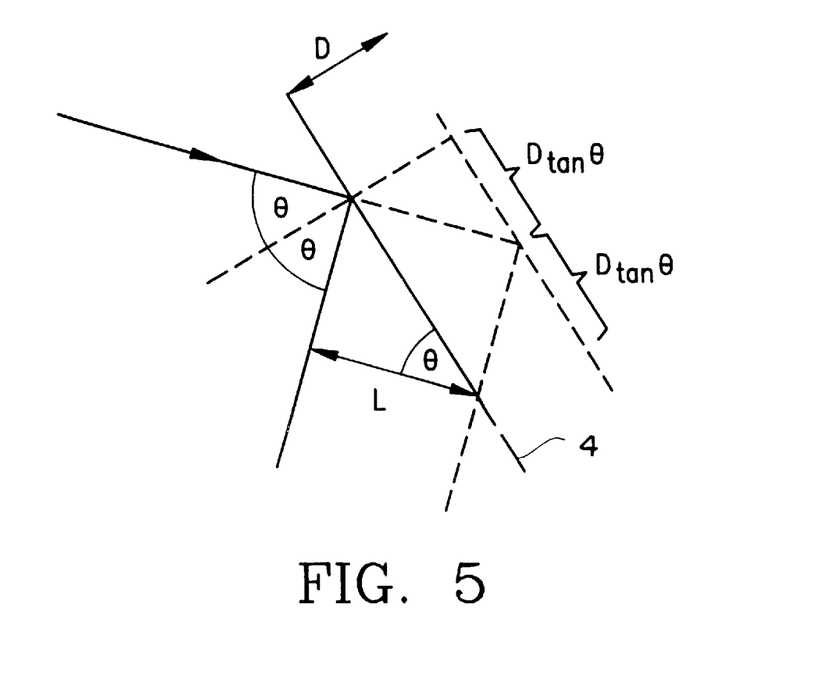
FIG. 5 shows the difference in optical paths at the tire surface with the apparatus of FIG. 1 in greater detail.
Figure 6:
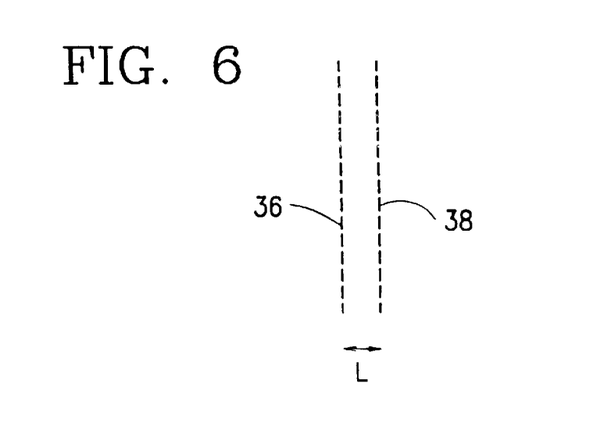
FIG. 6 schematically illustrates a trace produced from a single line scan across a tire by the apparatus of FIG. 1.

FIG. 4 represents the view along the direction of arrow A in FIG. 1. As shown in FIG. 4, the light 30 from the light (not shown in FIG. 4) and reflector 12 forms a plane of light which is inclined with respect to the surface normal 32 of the portion of the surface under inspection. Light which is reflected from the bottom of the tread 8 (as represented by the chain dot line in FIG. 4) travels slightly further than light reflected from the surface of the tire 2. Light specularly reflected from the tire 2 is directed towards a photodetector 34. In the arrangement shown in FIG. 4, light 36 reflected from the surface of the tire 2 is physically displaced from light 38 reflected from the bottom 8 of the tread. The displacement between the reflected light 36 and 38 is a function of the depth of the tire tread. This is shown in greater detail in FIG. 5. As shown in FIG. 5, the light beams become displaced by a distance L where L=2Dcosθ Tanθ, where D is the depth of the tire tread and θ is the angle of incidence. The photodetector 34 may be a linear array of charged coupled devices which, when used in association with a scanning laser spot, can be used to build up an image of the tread depth across a scan line. However, if the light source produces a line of laser light continually across the tire 2, then the detector may be a camera which directly images the reflected light pattern. Such a reflected light pattern is schematically illustrated in FIG. 6. The portions of the line 38 represent the position of the bottom of the tread, whereas the portions 36 represent the position of the surface of the tire 2. The distance L between the lines 36 and 38 is indicative of the depth of the tire tread. However, the optical inspection technique in fact provides a surface profile across the width of the tire 2 and can be used to make a more complex assessment of tire conditions, such as an analysis of uneven wear across the tire 2.

Figure 7:
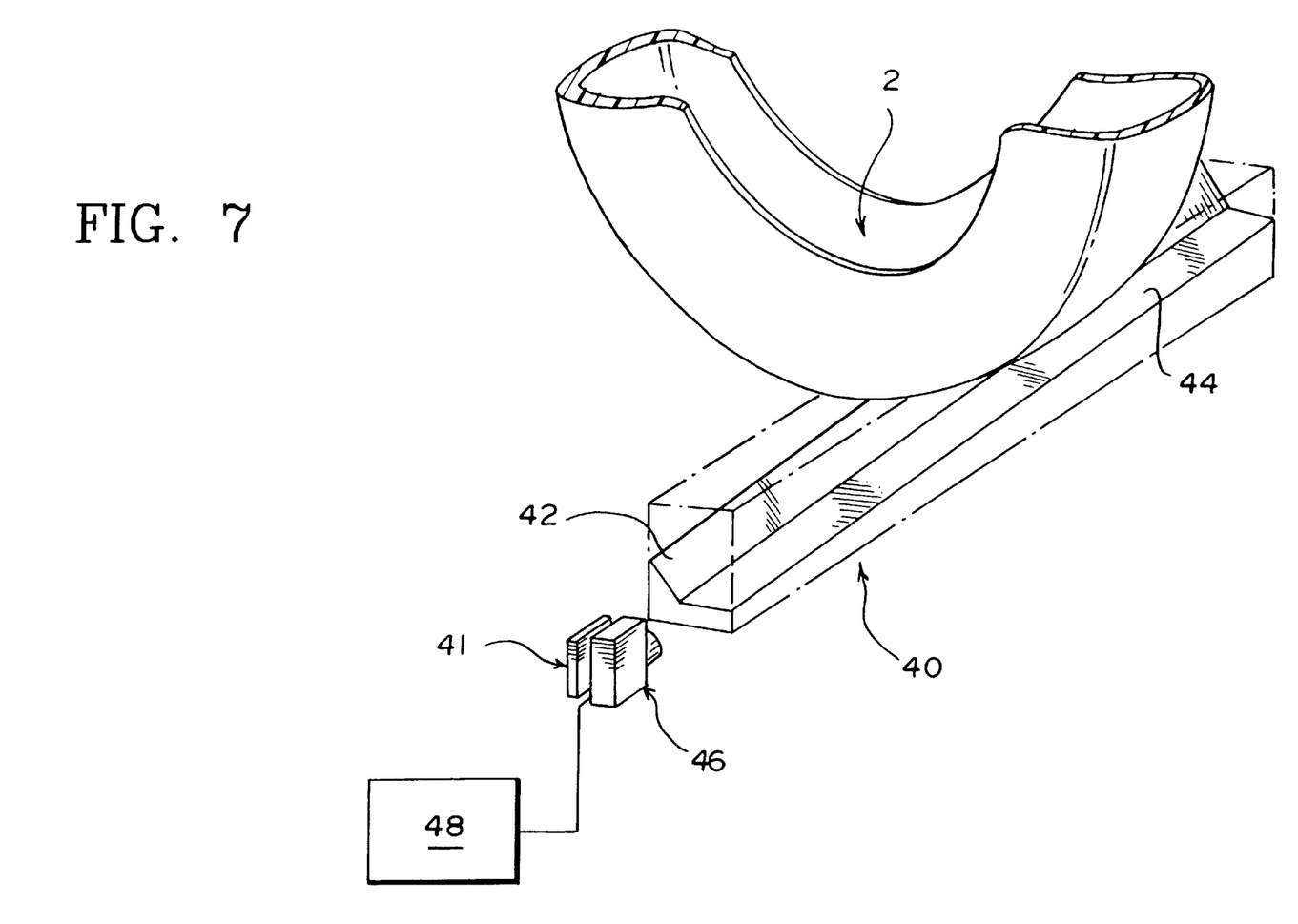
FIG. 7 is a perspective diagram of an imaging arrangement used in a second preferred embodiment of an apparatus for inspection of a tire tread according to the present invention.

FIG. 7 illustrates an embodiment of a sensor head 40 of a second embodiment of a tire tracking apparatus. A laser light source 41 (producing a scanning spot or an elongate beam) is directed towards a first faceted mirror 42. The first faceted mirror 42 is slightly inclined with respect to the axis of rotation of the tire 2 such that light from the laser 41 can be directed across the full width of the tire 2. A second faceted mirror 44 is similarly inclined. The mirrors 42 and 44 are further inclined with respect to each other such that light from the laser arrives obliquely at the tire 2 when viewed in a plane normal to the axis of rotation of the tire 2. Light specularly reflected from the surface of the tire 2 is directed by the second mirror 44 towards a CCD camera 46. The camera is connected to a data processor 48 which analyses the reflection pattern to determine the tread depth. The data processor 48 may also identify wear resulting from over-inflation, under-inflation, or tracking errors. The data processor 48 also works out the tire contact area in order to assess whether the tread depth is legal across the required width. The contact area may be assessed from calculations based on the tire's dimensions, by manual entry of the tire type or by comparison of the tread pattern with a database of tread patterns.

Figure 8:
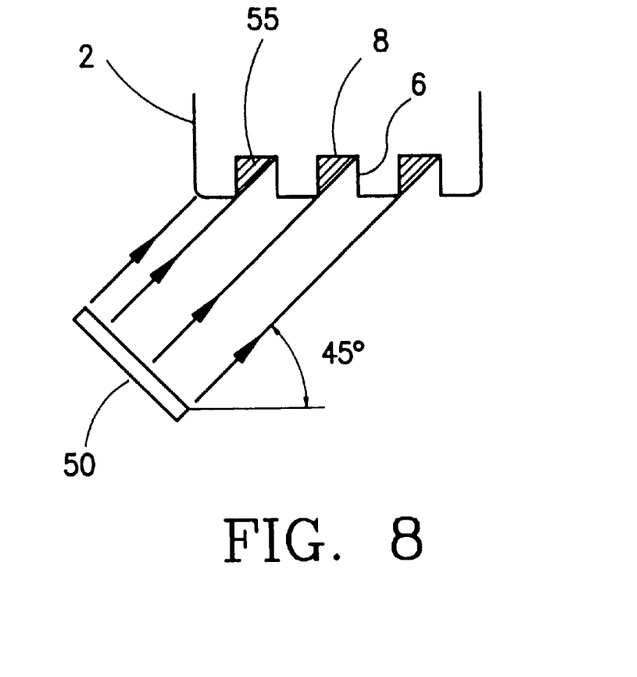
FIGS. 8 and 9 schematically illustrate an imaging arrangement of a third preferred embodiment of an apparatus for inspection of a tire tread according to the present invention.
Figure 9:
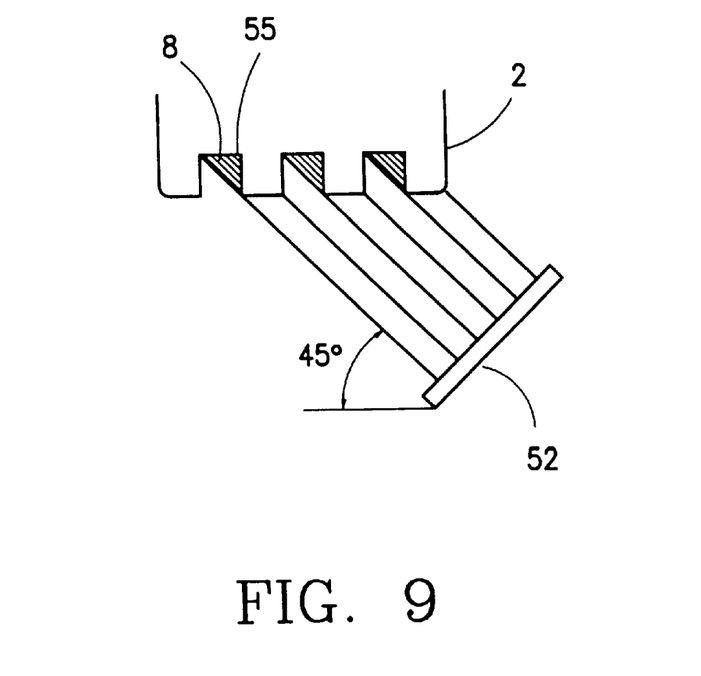

FIGS. 8 and 9 schematically illustrate an alternative lighting arrangement. As shown in FIG. 8, a first broad light source 50 is disposed towards one side of the tire 2. The light source 50 may be positioned in a plane defined by the axis of rotation of the tire 2 and a radial line to the area under inspection and the light source 50 may direct light within that plane such that light is incident at a predetermined angle, for example 45° to the surface of the tire 2. A similarly arranged light source 52 may be provided on the opposite side of the tire 2, as shown in FIG. 9.

Only one light 50, 52 is on at any given time. The raised tread pattern causes shadows 55 to be cast within the grooves 6. Thus light reflected from the tire surface is intensity modulated with the raised tread portions reflecting more light than the shadowed portions. It will be appreciated that when a tire 2 is new, the tread depth may exceed the width of the grooves 6. However this is irrelevant since the tire 2 clearly has an acceptable amount of tread. As the tire 2 wears, the depth of the grooves 6 becomes decreased and eventually they will wear down to such an extent that light can be reflected from the bottom 8 of the grooves 6. Once this occurs, the width of the shadow is directly related to the depth of the tread. The reflected light is directed towards a camera where the image is captured and sent to a data processor for processing.

Figure 10:
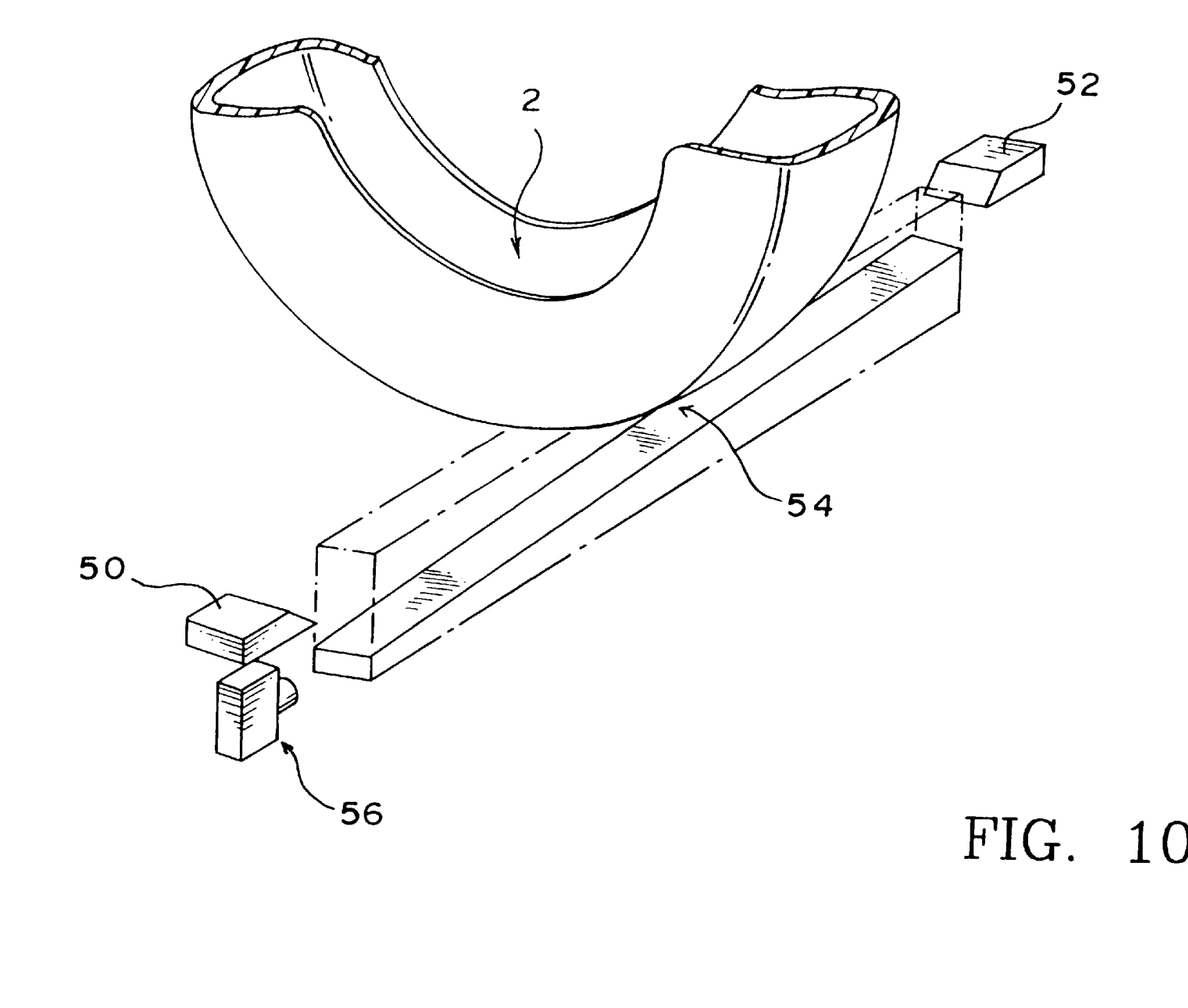
FIG. 10 is a perspective diagram of a sensor head used as part the apparatus of FIGS. 8 and 9.

FIG. 10 schematically illustrates the test head of a tire tread sensor which works in accordance with the principles herein before described with reference to FIGS. 8 and 9. As shown in FIG. 10, first and second strobe lights 50, 52 are disposed either side of the tire 2. The strobe lights 50, 52 have been drawn more displaced from the tire 2 and would be necessary to achieve the 45° illumination illustrated in FIGS. 8 and 9. Light reflected from the tire 2 is collected by a faceted mirror 54 and directed towards camera 56.

Figure 11:
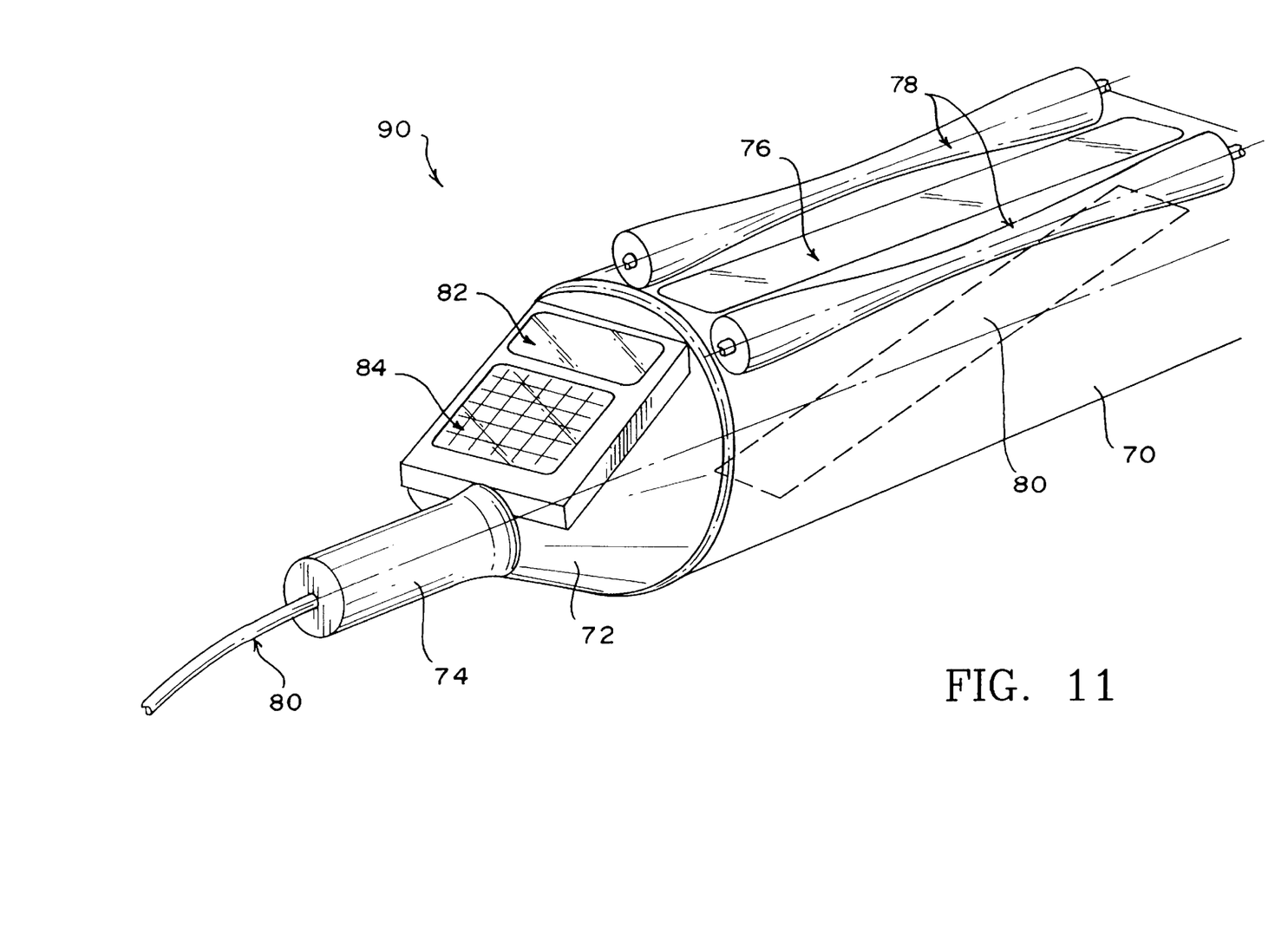
FIG. 11 is a perspective diagram of a fourth preferred embodiment of an apparatus for inspection of a tire tread according to the present invention in the form of hand held apparatus.

FIG. 11 schematically illustrates a hand held unit 90 suitable for use for performing a road side tire check. The hand held unit 90 can utilize the line scanning mode of operation described with reference to FIGS. 1 to 3 or the offset illumination method as described with reference to FIGS. 8 to 10. Either technique is equally suited for this application. The sensor head is located within a housing 70 which is rotatably attached to a portion 72 incorporating a hand grip 74. The housing 70 has a slot or image window 76 formed therein, which in use, faces towards the tread of the tire 2 under inspection. Guide rollers 78 are provided either side of the slot or image window 76. In use, the hand-held unit 90 is arranged such that the guide rollers 78 are pressed into contact with the tire 2 and then the hand-held unit 90 is moved around the periphery of the tire 2. The rotary connection between the housing 70 and the further portion 72 means that the housing 70 is free to rotate such that the guide rollers 78 maintain contact with the surface of the tire 2 and consequently such that the slot or image window 76 always faces directly towards the tread of the tire 2. Light reflected from the tire 2 is directed towards a photodetector, such as a camera (not shown) via a mirror 80 or other reflective elements.

A data processor (not shown) within the hand-held unit 90 analyses the reflected light pattern in order to determine whether the tire 2 has a legal tread pattern or not. Alternatively, the data collected by the camera may be transmitted to a remote data processor, for example via a radio link. The hand-held unit 90 may be provided with an RF antenna 80 for this purpose. The hand-held unit 90 may also be provided with an LCD display 82 and an alpha-numeric keypad 84.

Figure 12:
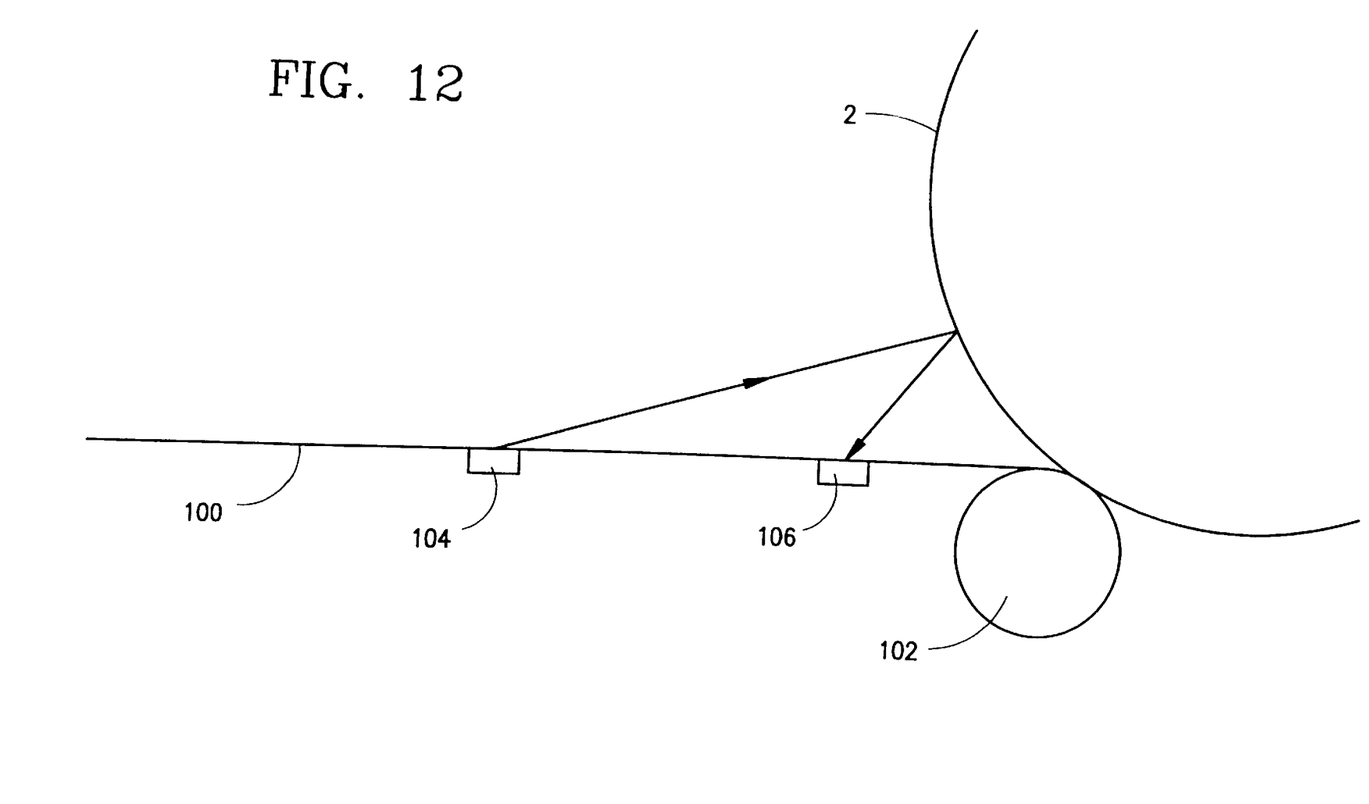
FIG. 12 schematically illustrates a fifth preferred embodiment of an apparatus for inspection of a tire tread according to the present invention incorporated within a rolling road.

FIG. 12 schematically illustrates an embodiment of the present invention incorporated within a rolling road 100. Rolling roads are typically used to test braking performance. The vehicle is normally positioned such that its tires are held between two rollers 102 (only one of which is shown) which serve to allow the tire 2 to rotate or be rotated whilst the vehicle is stationary. The light source 104 and a photodetector 106 are provided in grooves running transversely of the rolling road 100. The grooves may open towards to tire 2 and may be protected by thick plating in order that the inspection apparatus is not damaged when vehicles drive on or off the rolling road 100. The light source 104 and photodetector 106 may be as described with respect to the earlier embodiments, and typically are separated by half a meter, although this is a design choice.

Figure 13:
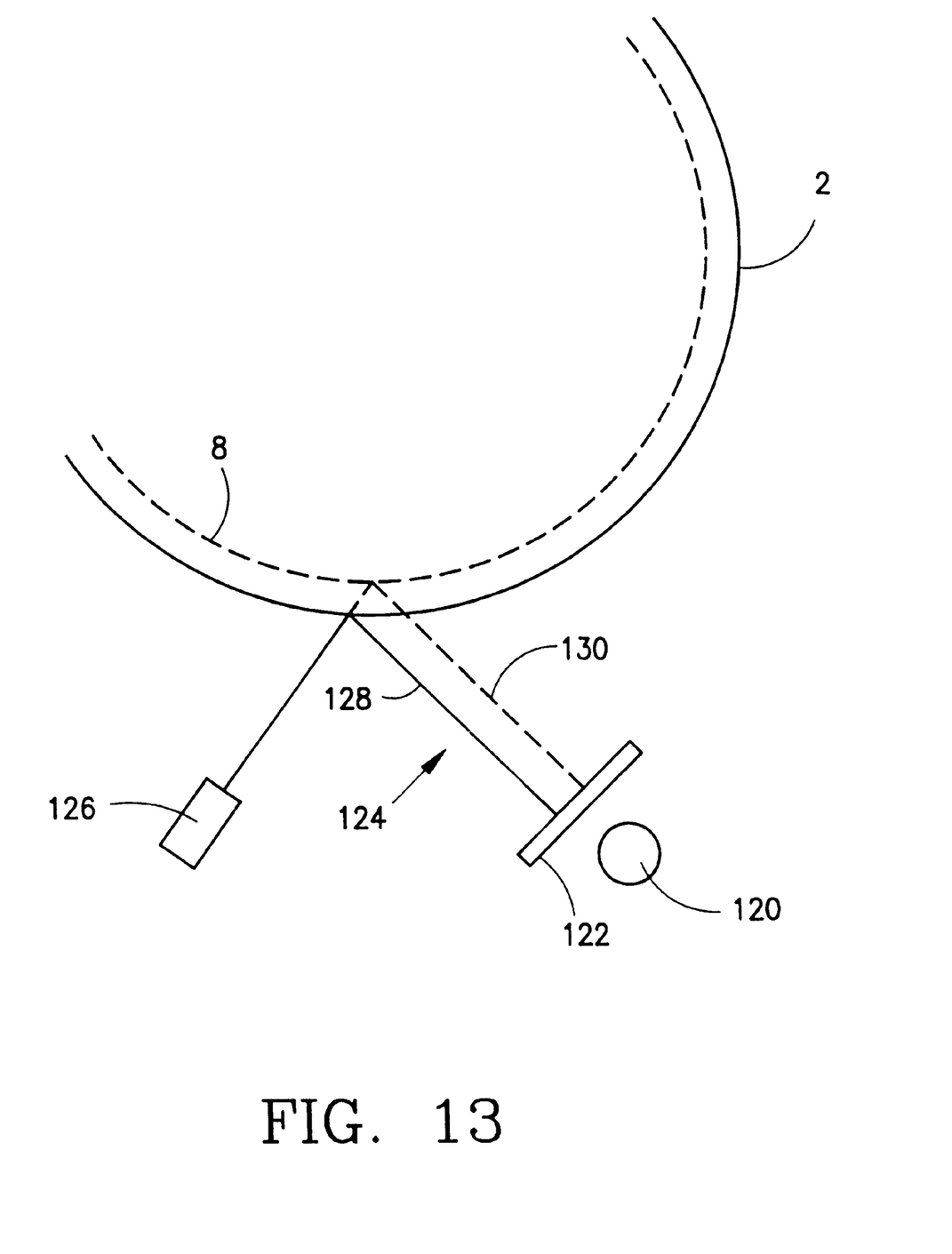
FIG. 13 schematically represents a sixth preferred embodiment of an apparatus for inspection of a tire tread according to the present invention.

FIG. 13 schematically illustrates a further embodiment in which an elongate light source 120, such as a fluorescent tube or one or more linear filament bulbs, illuminates a tire 2 via a diffraction grating 122. This produces a broad beam of substantially parallel light 124 where the wavelength/colour varies across the beam. Light reflected from the surface of the tire 2 is detected by a wavelength sensitive detector 126 or detector array such that the wavelength/colour of the reflected light can be analyzed.

The detector 126 views a narrow portion of the tire 2. As shown in FIG. 13, the region of the light beam 124 which is directed towards the detector 126 varies in accordance with the position of the reflecting surface. Thus light 128 of a first color is directed towards the detector 126 by the surface of the tire 2, whereas light 130 of a second color is reflected from the bottom 8 of the grooves 6 of the tread towards detector 126. Thus the difference in color is indicative of the tread depth.

It is thus possible to provide a tire inspection apparatus capable of providing quick and accurate indications of the tread depth or a pass/fail analysis of tire condition.

The above description and accompanying drawings are only illustrative of preferred embodiments which can achieve and provide the objects, features, and advantages of the present invention. It is not intended that the invention be limited to the embodiments shown and described herein. The invention is only limited by the spirit and scope of the following claims.

I claim:

1. An apparatus for measuring the depth of a tire tread having a top surface and a bottom surface, the apparatus comprising:

a radiation source for producing radiation for illuminating the surface of a tire, the radiation source being positioned such that an angle of incidence of radiation emanating therefrom with respect to a tire tread surface being measured is non-normal;

a radiation detector responsive to radiation reflected from the tire; and a processor in communication with the detector for determining the tire tread depth by comparing differences in displacement between radiation reflected from the bottom surface of the tire tread and radiation reflected from the top surface of the tire tread.

2. The apparatus of claim 1, wherein the radiation source produces collimated radiation.

3. The apparatus of claim 1, wherein the radiation source produces light.

4. The apparatus of claim 1, wherein the radiation source is a laser.

5. The apparatus of claim 1, wherein the radiation source comprises an elongate light source and a collimator.

6. The apparatus of claim 1, wherein the radiation source produces a sheet of light.

7. The apparatus of claim 1, wherein the radiation source produces a light spot, and the light spot is displaced linearly across a tire tread surface being measured.

8. The apparatus of claim 7, wherein the light spot is displaced by a rotating mirror.

9. The apparatus of claim 7, wherein the light spot is displaced by displacement of the radiation source.

10. The apparatus of claim 1, wherein the detector is a photodetector.

11. The apparatus of claim 10, wherein the photodetector is a charged coupled device.

12. The apparatus of claim 1, wherein the apparatus further comprises a reflector sized and positioned between the radiation source and a tire tread surface.

13. The apparatus of claim 12, wherein the reflector is a faceted mirror.

14. The apparatus of claim 12, wherein the reflector is a transparent prism utilizing total internal reflection.

15. An apparatus for measuring the depth of a tire tread having a top surface and a bottom surface, the apparatus comprising:

a radiation source for producing radiation for illuminating the surface of a tire, the radiation source being positioned such that an angle of incidence of radiation emanating therefrom with respect to a tire tread surface being measured is non-normal;

a radiation detector responsive to radiation reflected from the tire; and a processor in communication with the detector for determining the tire tread depth by comparing differences in displacement between radiation reflected from the bottom surface of the tire tread and radiation reflected from the top surface of the tire tread;

wherein the radiation source and the radiation detector remain in fixed positions during operation of the apparatus.

16. The apparatus of claim 15, wherein the radiation source produces collimated radiation.

17. The apparatus of claim 16, wherein the radiation source and the radiation detector are fixedly attached to a surface incorporating a rolling road.

18. An apparatus for measuring the depth of a tire tread having a top surface and a bottom surface, the apparatus comprising:

a radiation source for producing radiation for illuminating the surface of a tire, the radiation source being positioned such that an angle of incidence of radiation emanating therefrom with respect to a tire tread surface being measured is non-normal;

a radiation detector responsive to radiation reflected from the tire; and a transceiver in communication with the detector and a processor for determining the tire tread depth by comparing differences in displacement between radiation reflected from the bottom surface of the tire tread and radiation reflected from the top surface of the tire tread;

wherein the radiation source, the radiation detector and the transceiver are enclosed in a hand-held housing.

19. The apparatus of claim 18, wherein the radiation source produces collimated radiation.

20. The apparatus of claim 19, further comprising a reflector positioned between the radiation source and the radiation detector.

21. The apparatus of claim 18, wherein the hand-held housing further comprises:

a first surface;

a second surface rotatably attached to the first surface;

a guide roller for following the contour of a tire, the guide roller being rotatably attached to the first surface;

an antenna electrically connected to the transceiver; and a display electrically connected to the transceiver for displaying tire tread depth information.

22. A method for measuring the depth of a tire tread having a top surface and a bottom surface, the method comprising the steps of:

collimating radiation;

radiating the surface of a tire with collimated radiation such that an angle of incidence of the collimated radiation with respect to a tire tread surface being measured is non-normal; and measuring differences in displacement between radiation reflected from the bottom surface of the tire tread and radiation reflected from the top surface of the tire tread.

23. The method of claim 22, wherein the radiating step is performed by scanning a light spot across the tire tread surface being measured.

24. The method of claim 23, wherein the scanning step is performed using a rotating mirror.

25. The method of claim 22, wherein the radiating step is performed by forming a sheet of light across the tire tread surface being measured.

26. The method of claim 25, wherein the sheet of light is reflected by a faceted mirror.

27. The method of claim 25, wherein the sheet of light is reflected by a prism.

* * * * *